Aug. 11, 1959  C. M. MURPHY  2,899,273
PROCESS FOR THE MANUFACTURE OF ANHYDROUS, HEAVY
METAL-FREE SULFITES
Filed Nov. 24, 1954
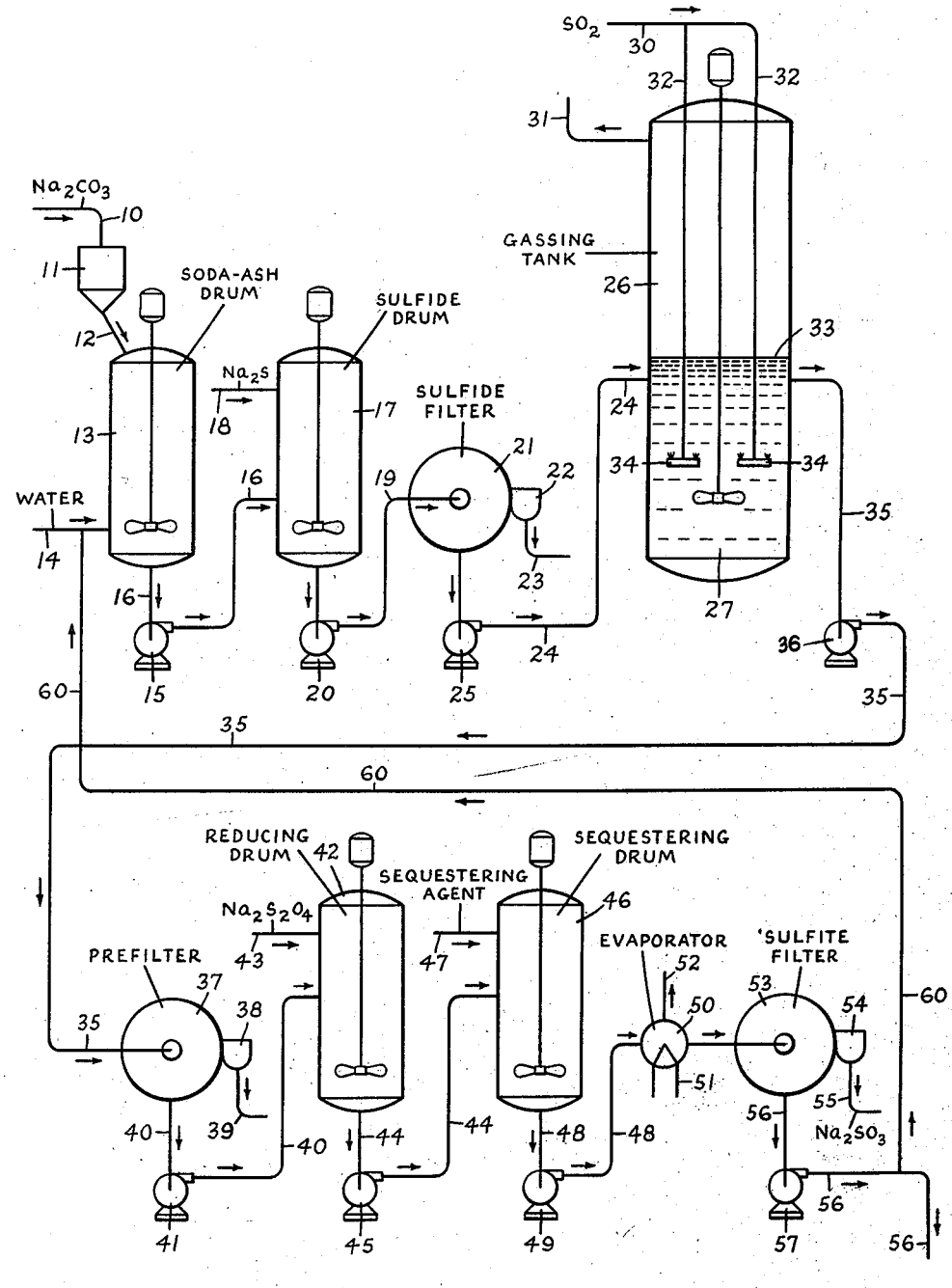
INVENTOR.
CORNELIUS M. MURPHY
BY
ATTORNEY

2,899,273
PROCESS FOR THE MANUFACTURE OF ANHYDROUS, HEAVY METAL-FREE SULFITES

Cornelius M. Murphy, New York, N.Y., assignor to Allied Chemical Corporation, a corporation of New York Application November 24, 1954, Serial No. 470,969

9 Claims. (Cl. 23—129)

This invention relates to the manufacture of sulfites, particularly alkali metal sulfites. More particularly it relates to a process for purification of sulfite liquors to facilitate production of sodium sulfite of a high degree of purity.

Sodium sulfite and its derivatives are employed in industry in a wide variety of uses, in many of which the presence of small amounts of impurities are detrimental. In photographic work, for example, which consumes a large amount of this product, it is essential that the salt be snow-white and iron-free and in particular that its water-solution be clear, colorless, and free from cloudiness or turbidity. Although sodium sulfite having these desired properties has been heretofore obtainable, this has only been possible when it was produced by the reaction between sulfur dioxide and caustic soda. This particular product while chemically satisfactory, has been found to be much more expensive (because of the cost of caustic soda as raw material) than the less pure product formed from soda ash which typically may produce a turbid or yellowish-brown aqueous solution.

It is known that this color may be diminished to some extent by treating the solution of sodium sulfite with a sulfide which will precipitate some of the heavy metal salt impurities and decrease to some extent the yellowish color of the solution. No commercially extant process has, however, successfully and cheaply produced from soda ash a totally satisfactory snow-white, anhydrous sodium sulfite of properly coarse crystalline size, free of color in crystal, and readily soluble in water to yield a water-white solution free of turbidity or cloudiness.

An object of this invention is to prepare an anhydrous sulfite, such as sodium sulfite, which is snow-white in appearance, high in sulfite content, low in heavy metal impurities, especially iron, and low in insoluble materials, which may be dissolved in water to yield a water-white solution which is free of turbidity and cloudiness. Other objects of this invention will be apparent to those skilled-in-the-art on inspection of the accompanying drawing and the following description.

According to certain of its aspects, this invention relates to a method of making pure, snow-white, heavy metal-free, anhydrous sulfites, particularly alkali metal sulfites such as sodium sulfite, wherein a solution of sulfite containing residual heavy metal impurities is treated with a sequestering agent capable of chelating said impurities preferably after the same have been reduced to lower state of oxidation by reducing agent.

According to certain of its other aspects, this invention comprises a method of making pure snow-white, heavy metal-free, anhydrous sulfites, particularly alkali metal sulfites such as sodium sulfite, wherein a water-soluble sulfide is added to an aqueous charge solution of alkali metal carbonate, e.g. soda ash, preferably formed at least in part from recycle mother liquor containing a sequestering agent in combined form. As heavy metal sulfides precipitate, combined sequestering agent is liberated. Precipitated sulfides, representing the major portion of the heavy metals present in the charge soda ash are filtered from the solution. Sulfite solution may be formed typically as by gassing the filtrate with sulfur dioxide. Solid impurities may be filtered out and preferably a reducing agent e.g. alkali metal hyposulfite, may be added to convert heavy metals to lower states of oxidation, thus facilitating subsequent sequestration. Sequestering agent is added to the solution which is then boiled to precipitate anhydrous, colorless heavy metal-free alkali metal sulfite which may be separated by filtration. The mother liquor from the filtration, containing sequestering agent in combined form, i.e. together with small amounts of heavy metals, may be recirculated and employed to make up the aqueous carbonate charge solution.

For purpose of explaining this invention and presenting one specific embodiment thereof, reference is made to the accompanying drawing and to the following description in which specific temperatures, pressures, concentrations, pH, etc. are referred to by way of example only and not by way of limitation.

Soda ash is admitted through line 10 to storage hopper 11 from which it is charged through line 12 to soda ash drum 13, wherein it is dissolved in water which is admitted thereto through line 14. Typically soda ash may contain 0.0008% to 0.003%, say 0.002% of heavy-metal impurities, mainly iron. Recycle mother liquor, containing from 0.01% to 0.15%, say 0.06% sequestering or chelating agent in combined form may also be admitted to soda ash drum 13 through lines 60 and 14. As prepared in drum 13 and removed therefrom through line 16 the concentration of heavy metal impurities may be 0.0003% to 0.0015% when the concentration of soda ash may be 15% to 32%, say 30% by weight of total solution. Concentration of sequestering agent in combined form may be from 0.005% to 0.08%, say 0.03% of total solution in line 16. At the temperature of 100–130° F., say 110° F., the solution may have a density of 25° Bé. to 35° Bé., say 30° Bé. If the charge water and recycle mother liquor admitted to drum 13 are at lower temperature, the drum may be supplied with a steam coil or other heating means, not shown, to bring the solution to the desired temperature.

The charge soda ash solution in line 16 is pumped by pump 15 to sulfide drum 17 wherein it is treated with a water-soluble sulfide preferably in aqueous solution although gaseous hydrogen sulfide may be employed. Typically the sulfide may be sodium sulfide in solution of concentration of 10% to 20%, say 15% and as added, the sulfide may be present in drum 17 in amount from 0.005% to 0.03%, say 0.01% of the solution in line 16. Contact between the sulfide and the iron which may have been introduced to the solution in line 16 mainly through the original soda ash in line 10, will be sufficient to insure precipitation of from 80% to 98%, say 90% of the iron as its sulfides. The slurry of charge solution and precipitated sulfide is removed from sulfide drum 17, through line 19 and pump 20, and passed to sulfide filter 21. Here the solid sulfide is collected in vessel 22 and is removed from the system through line 23.

The sequestering agent in combined form which had entered the soda ash solution through the recycle mother liquor of line 60, is liberated by the action of the sulfides, in the alkaline solution in sulfide drum 17. Here at least a portion of the iron present in chelated form is precipitated from the alkaline solution as its sulfide. The amount of agent thus liberated may correspond to from 80% to 100%, say 90% of that present in line 16, which may be from 60%, to 90%, say 75% of that which may be necessary to supply the total requirements of the system the balance being admitted through line 47 as hereinafter described.

Purified charge liquor now containing preferably less than 0.00006%, say 0.00004% of iron, is removed from sulfide filter 21 through line 24 and pump 25. According to one method of practicing this invention, this partially purified solution containing typically 25% to 35%, say 30% soda ash, is passed through line 24 to gassing tank 26. Sulfur dioxide gas of concentration of 8.0% to 10.0%, typically gas from a sulfuric acid plant of concentration of ca. 8.5% by weight of sulfur dioxide in an otherwise inert gas e.g. nitrogen, is admitted to the gassing tank 26 through lines 30 and 32 and spargers 34. As the sulfur dioxide rises upwardly through the liquor 27 in gassing tank 26, it reacts with the soda ash liquor. Agitation of the contents 27 in vessel 26 is sufficient to insure complete reaction of sulfur dioxide and liquid with attendant liberation of carbon dioxide. Off-gas in line 31 from the gassing tank, after the desired reaction has been completed will contain carbon dioxide and preferably less than 0.1% sulfur dioxide. The reaction which occurs in gassing tank 26 may be as follows:

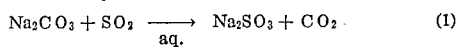

$$Na_2CO_3 + SO_2 \xrightarrow{aq.} Na_2SO_3 + CO_2 \quad (1)$$

The rich liquor removed from tank 26 through line 35 and pump 36 is acid to thymolphthalein. The pH of this "acid liquor" may be from 6.0 to 7.0, say about 6.5, and its acidity may be such that a 10 cc. sample requires 7.0–11.0 cc. of 1.0 N NaOH to neutralize the sample as determined by thymolphthalein indicator. At this stage the finished liquor may typically have a density of 27° Bé. to 37° Bé., say 33° Bé. at e.g. 100° F.–130° F. Prefiltration may be performed by passing liquor from vessel 26 through line 35 and pump 36 to prefilter 37 wherein solid insoluble impurities may be removed from solution and withdrawn through collector 38 and line 39.

The filtered solution of sulfite containing residual amounts of heavy metal impurities and prepared as indicated or by other equivalent processes, is passed through pump 41 and line 40 to reducing drum 42. Addition at this point of a strong reducing agent, typically sodium hydrosulfite ($Na_2S_2O_4$) in amount of 0.005% to 0.04%, say 0.01%, may be and preferably is employed to reduce the residual heavy metals, now present in amount of 0.0002% to 0.0005%, say 0.0003% of total solution, to their respective lower levels of oxidation. Iron for example, to the extent present in the solution at this point, may be reduced from its trivalent ferric state to its divalent ferrous state, which reduction facilitates sequestration as hereinafter described. Contact is maintained in vessel 42 for time sufficient to effect the reducing action, and the sulfite solution is then removed through line 44 and pump 45 to be passed to sequestering drum 46. Sodium hydrosulfite is employed as the preferred reducing agent, because in accomplishing the desired reaction, it is oxidized to sodium sulfite.

The sequestering agent added to drum 46 through line 47 is adapted to chelate iron or other heavy metals. Preferably the chelating or complexing agent will be selected from the alkali metal salts of certain amino acids, including polyamino polycarboxylic acids and may typically be a salt of ethylene diamine tetra acetic acid e.g. the tetra sodium salt. Other typical sequestering agents which may find use in the practice of this invention include complex phosphates such as Calgon (sodium hexametaphosphate), tri-polyphosphate, tetra sodium pyrophosphate and sodium tetraphosphate. Complexing agent may be added in amount of 0.01%–0.10%, say 0.04% by weight of total solution in line 44, depending on the concentration of residual iron and sequestering agent therein. The amount of sequestering agent will preferably be adjusted to sequester substantially all the heavy metal content of the solution. When employing the tetra sodium salt of ethylene diamine tetra acetic acid to sequester heavy metals of concentration of 0.0003% in line 44, expressed as ferrous iron, preferred concentration of agent added through line 47 is 30.0% The chelated solution in line 48 customarily may contain from 25.0% to 30.0%, say 28.0% sodium sulfite together with heavy metal, expressed as iron, in amount less than 0.0003% and preferably less than about 0.0001% by weight of solution. Pump 49 passes this liquor through line 48 into evaporator 50 heated as by steam coil 51, to temperature of 180° F. to 230° F., say 220° F. preferably to the boiling point of the liquid in line 48. This temperature is at least above that at which the heptahydrate of sodium sulfite decomposes to precipitate the anhydrous crystalline material under the pressure of operation which may be atmospheric. Steam which may be liberated during the evaporation may be withdrawn through line 52. The boiling solution will customarily contain because of prior control of the various operations, extremely small amounts of iron as indicated. Soda ash may be present to the extent of less than 0.15% or sodium bisulfite may be present in amount of less than 0.15% by weight of total solution.

As the solution is heated in evaporator 50 sodium sulfite precipitates from solution as desirably coarse crystals typically of 20 to 200 mesh. These may be separated in sulfite filter 53 and removed therefrom through collector 54 and line 55. Typically these product crystals will meet the following specifications:

| | |
|---|---|
| Color of salt | Snow-white. |
| Color of aqueous solution | Water-white. |
| Iron content | Less than 0.0005%. |
| Specific gravity | 2.63. |
| pH of 20% solution | 9–10. |
| Percent carbonate (as soda ash) | Less than 0.15%. |
| Percent bisulfite (as sodium bisulfite) | Less than 0.20%. |
| Percent sulfate (as sodium sulfate) | Less than 1.0%. |

Mother liquor from sulfite filter 53 contains in chelated form heavy metals including iron. The sequestering agent is present in mother liquor to the extent of 0.01% to 0.15%, say 0.06% in combined form with these heavy metals. This mother liquor, withdrawn from filter 53, is passed through pump 57 and line 56 and through lines 60 and 14 back to the charge soda ash drum 13 into which it is admitted with the water from line 14. If desired, a portion of this mother liquor may be withdrawn from the cycle from time to time through line 56.

I claim:

1. In the process of manufacture of heavy metal-free, anhydrous sodium sulfite from sodium carbonate wherein a major portion of heavy metal impurities are removed from sodium carbonate solution by precipitation as insoluble sulfides, said solution being gassed with sulfur dioxide to form sodium sulfite solution from which anhydrous sodium sulfite is crystallized, the improvement which comprises adding to said solution before crystallization of sodium sulfite a reducing agent in amount sufficient to reduce residual heavy metal impurities to lower states of oxidation, and adding a metal salt of ethylene diamine tetra-acetic acid in amount sufficient to sequester residual heavy metal impurities in said solution, whereby said crystallized anhydrous sodium sulfite is snow-white and heavy metal-free.

2. In the process of manufacture of heavy metal-free anhydrous sodium sulfite from sodium carbonate wherein a major portion of heavy metal impurities are removed from sodium carbonate solution by precipitation as insoluble sulfides, said solution being gassed with sulfur dioxide to form sodium sulfite solution from which anhydrous sodium sulfite is crystallized, the improvement which comprises adding to said solution before crystallization of sodium sulfite a reducing agent in amount sufficient to reduce residual heavy metal impurities to lower states of oxidation, and adding a metal salt of a polyamino polycarboxylic acid in amount sufficient to sequester residual heavy metal impurities in such solution, whereby said crystallized anhydrous sodium sulfite is snow-white and heavy metal-free.

3. The process for the manufacture of heavy metal-free, anhydrous sodium sulfite which comprises forming an aqueous solution containing 15% to 32% by weight of soda ash, treating said aqueous soda ash solution with from 0.005% to 0.03% by weight of an alkali metal sulfide whereby heavy metal impurities including iron present in said solution are precipitated as insoluble sulfides and the resultant purer soda ash solution contains less than 0.00006% heavy metal impurities, filtering said purer soda ash solution to separate the precipitated sulfides therefrom, gassing the filtered soda ash solution with sulfur dioxide to form a sodium sulfite solution acid to thymolphthalein indicator, treating said sulfite solution with sodium hydrosulfite to reduce residual heavy metal impurities including iron in said sulfite solution to lower states of oxidation, sequestering the reduced heavy metal impurities including iron in said sulfite solution by adding an agent which forms soluble complexes containing the heavy metal impurities including iron in non-precipitatable form, evaporating the sulfite solution containing the sequestered metal impurities by heating the solution to a temperature of from 180° to 230° F. whereby pure, heavy metal-free, anhydrous sodium sulfite crystals are precipitated, separating said heavy metal-free, sodium sulfite crystals from the solution, and returning at least a portion of the last mentioned solution containing sequestered heavy metal impurities including iron to said first step for dissolution therein of soda ash.

4. The process for the manufacture of heavy metal-free, anhydrous alkali metal sulfite which comprises treating an aqueous solution of alkali metal carbonate containing heavy metal impurities with a water-soluble sulfide to precipitate a major portion of said metal impurities, separating the precipitated impurities from resultant purer alkali metal carbonate solution, forming an alkali metal sulfite solution from said purer carbonate solution by displacing the $CO_2$ of said carbonate by $SO_2$, sequestering residual heavy metal impurities in said sulfite solution by adding an agent which forms soluble complexes containing the heavy metal impurities in non-precipitatable form, crystallizing pure, anhydrous alkali metal sulfite crystals from said solution containing said complexes of metal impurities in non-precipitatable form, and separating said pure, anhydrous alkali metal sulfite crystals from the solution.

5. The process for the manufacture of heavy metal-free, anhydrous alkali metal sulfite which comprises treating an aqueous solution of alkali metal carbonate containing heavy metal impurities including iron with a water-soluble sulfide to precipitate a major portion of said metal impurities, separating the precipitated impurities from resultant purer alkali metal carbonate solution, forming an alkali metal sulfite solution from said purer carbonate solution by displacing the $CO_2$ of said carbonate by $SO_2$, adding a reducing agent to said alkali metal sulfite solution to reduce residual heavy metal impurities including iron to lower states of valence thereby facilitating subsequent sequestration, sequestering the reduced heavy metal impurities including iron in said sulfite solution by adding an agent which forms soluble complexes containing the heavy metal impurities in non-precipitatable form, crystallizing pure, anhydrous alkali metal sulfite crystals from said solution containing said complexes of metal impurities in non-precipitatable form, and separating said pure, anhydrous alkali metal sulfite crystals from the solution.

6. The process for the manufacture of heavy metal-free, anhydrous alkali metal sulfite which comprises forming at least in part from recycled mother liquor hereinafter described containing sequestered heavy metal impurities including iron an aqueous solution of an alkali metal carbonate containing non-sequestered heavy metal impurities including iron, treating said carbonate solution with a water-soluble sulfide to precipitate a major portion of the sequestered and non-sequestered heavy metal impurities including iron, separating the precipitated impurities from resultant purer alkali metal carbonate solution, forming an alkali metal sulfite solution from said purer alkali metal carbonate solution by displacing the $CO_2$ of said carbonate by $SO_2$, sequestering residual heavy metal impurities including iron in said sulfite solution by adding an agent which forms soluble complexes containing the heavy metal impurities including iron in non-precipitatable form, evaporating the sulfite solution containing the sequestered heavy metal impurities by heating whereby pure, anhydrous alkali metal sulfite crystals are formed, separating said pure, anhydrous sulfite crystals from the solution thereby to provide the aforesaid mother liquor, and recycling at least a portion of said mother liquor containing the sequestered heavy metal impurities to the step of forming the aqueous solution of alkali metal carbonate.

7. In the process of manufacture of heavy metal-free, anhydrous sodium sulfite from sodium carbonate wherein a major portion of heavy metal impurities are removed from an aqueous solution of sodium carbonate by precipitation as insoluble sulfides, said solution being gassed with sulfur dioxide to form sodium sulfite solution from which anhydrous sodium sulfite is crystallized, the improvement which comprises before crystallization of sodium sulfite sequestering residual heavy metal impurities in said sulfite solution by adding an agent which forms soluble complexes containing the heavy metal impurities in non-precipitatable form, thereafter crystallizing pure, heavy metal-free, snow-white, anhydrous sodium sulfite crystals from said solution containing said complexes of metal impurities in non-precipitatable form, and separating the pure, heavy metal-free, snow-white, anhydrous sodium sulfite crystals from the solution.

8. In the process of manufacture of heavy metal-free, anhydrous sodium sulfite from sodium carbonate wherein a major portion of heavy metal impurities are removed from an aqueous solution of sodium carbonate by precipitation as insoluble sulfides, said solution being gassed with sulfur dioxide to form sodium sulfite solution from which anhydrous sodium sulfite is crystallized, the improvement which comprises before crystallization of sodium sulfite adding to said sulfite solution a reducing agent in amount sufficient to reduce residual heavy metal impurities to lower states of oxidation, sequestering the reduced heavy metal impurities in said sulfite solution by adding an agent which forms soluble complexes containing the heavy metal impurities in non-precipitatable form, thereafter crystallizing pure, heavy metal-free, snow-white, anhydrous sodium sulfite crystals from said solution containing said complexes of metal impurities in non-precipitatable form, and separating the pure, heavy metal-free, snow-white, anhydrous sodium sulfite crystals from the solution.

9. The process as claimed in claim 8 wherein said agent is selected from the group consisting of sodium hexametaphosphate, tetrasodium pyrophosphate and sodium tetraphosphate.

References Cited in the file of this patent
UNITED STATES PATENTS

| | | |
|---|---|---|
| 1,937,944 | Butler | Dec. 5, 1933 |
| 2,080,528 | Bowman et al | May 18, 1937 |
| 2,245,697 | Melendy | June 17, 1941 |
| 2,719,075 | Allen | Sept. 27, 1955 |